United States Patent [19]

Mowill

[11] Patent Number: 4,704,861
[45] Date of Patent: Nov. 10, 1987

[54] APPARATUS FOR MOUNTING, AND FOR MAINTAINING RUNNING CLEARANCE IN, A DOUBLE ENTRY RADIAL COMPRESSOR

[75] Inventor: R. Jan Mowill, Oslo, Norway

[73] Assignee: A/S Kongsberg Vapenfabrikk, Kongsberg, Norway

[21] Appl. No.: 933,357

[22] Filed: Nov. 19, 1986

Related U.S. Application Data

[63] Continuation of Ser. No. 798,147, Nov. 15, 1985, abandoned, which is a continuation of Ser. No. 610,580, May 15, 1984, abandoned.

[51] Int. Cl.$^4$ .............................. F02C 7/04; F02C 7/20
[52] U.S. Cl. ...................................... 60/39.32; 60/726; 415/98
[58] Field of Search ................... 60/39.31, 39.32, 726; 415/98, 102, 122, 131, 219 C

[56] References Cited

U.S. PATENT DOCUMENTS

| | | | |
|---|---|---|---|
| 2,432,359 | 12/1947 | Streid | 60/39.31 |
| 2,438,426 | 3/1948 | Whittle | 415/98 |
| 2,648,491 | 8/1953 | Wood | 415/122 |
| 2,695,499 | 11/1954 | Walker | 415/98 |
| 3,163,003 | 12/1964 | Paul et al. | 60/39.36 |
| 3,625,003 | 12/1971 | Liddle et al. | 60/39.25 |
| 3,706,509 | 12/1972 | Britt | 415/131 |

FOREIGN PATENT DOCUMENTS

| | | | |
|---|---|---|---|
| 918160 | 1/1947 | France | 60/39.32 |
| 658778 | 10/1951 | United Kingdom . | |
| 710862 | 6/1954 | United Kingdom . | |

Primary Examiner—Louis J. Casaregola
Attorney, Agent, or Firm—Finnegan, Henderson Farabow, Garrett & Dunner

[57] ABSTRACT

A gas generator having a double entry low pressure centrifugal compressor, a single entry high pressure centrifugal compressor and a radial inflow turbine positioned coaxially and coupled for interdependent rotation by a single shaft assembly for the double entry compressor mounted to the generator frame using a plurality of rigid hollow cross-over ducts which also carry diffused compressed air to the high pressure compressor, where the single shaft assembly uses two shaft portions connected by an expansible coupling having a helical spline torque transmitting device to allow the double entry compressor rotor to "follow" compressor housing axial position changer and to maintain a close running clearance despite thermal expansion in the structure between the low pressure (LP) and high pressure (HP) compressor portions of the gas generator.

20 Claims, 3 Drawing Figures

APPARATUS FOR MOUNTING, AND FOR MAINTAINING RUNNING CLEARANCE IN, A DOUBLE ENTRY RADIAL COMPRESSOR

This application is a continuation of Ser. No. 798,147, filed Nov. 15, 1985 (abandoned), which is a continuation of Ser. No. 610,580, filed May 15, 1984 (abandoned).

BACKGROUND OF THE INVENTION

The present invention relates to apparatus for supporting double entry centrifugal gas compressors and for maintaining the axial component of the compressor rotor running clearances.

Double entry centrifugal compressors are known per se and representative applications of these devices can be found in e.g. U.S. Pat. No. 2,438,426 (Whittle).

A problem caused by the twin, axially opposed compressor entrances occurs in applications where the compressor drive apparatus and the components for receiving the compressed gas are positioned axially adjacent the double entry compressor, such as in a gas turbine engine. This problem involves the thermal expansion of the cross-over ducts caused by compressed air heating during compressor operation which, if not accommodated in some manner, can cause shifts in the axial position of the compressor housing relative to that of the compressor rotor, a situation leading to unwanted changes in compressor rotor running clearance or increased component stress levels.

The prior art solution for this problem was to utilize a relatively rigid connection between the compressor housing and the axial adjacent engine components in conjunction with flexible bellows connections for the cross-over ducts to absorb the thermal expansion/contraction. While acceptable for the relatively low pressure ratios (i.e. less than about 6:1) characteristic of prior art double entry radial compressors, the bellows connection may be inadequate for the new generation of double entry radial compressors such as is disclosed in U.S. Pat. No. 577,359 where pressure ratios greater than about 6:1 are expected.

SUMMARY OF THE INVENTION

In accordance with the present invention, as embodied and broadly described herein, the apparatus of this invention for controlling the running clearance and improving the stability of a dual entry radial gas compressor of the type having a housing with a pair of axially opposed entrances for the incoming gas, a common radially disposed exit, diffuser means for converting high velocity gas received from the compressor exit to higher pressure, higher temperature and lower velocity, and a compressor rotor positioned within the housing and mounted on a shaft rotatably carried by the housing, the diffused high pressure, high temperature gas being deliverable to an axially adjacent compressed gas receiving means, the receiving means also including compressor driving means having a drive shaft for in-line connection to the compressor shaft, the apparatus comprises compressor inlet shroud means for channeling the incoming gas to the compressor entrances, the inlet shroud means including flow symmetric first and second inlet shrouds operatively connected to respective compressor axial entrances; a plurality of elongated, hollow rigid support means distributed around, and extending essentially parallel to, the shaft, the support members supportably interconnecting the dual entry compressor and the first and second inlet shrouds to the compressed air receiving means, the support members determining the axial positions of the compressor housing relative to the compressed gas receiving means, and support members being configured to present in the first inlet shroud, profiles to the incoming air flow that are substantially identical to the profiles presented in the second inlet shroud; means for channeling the diffused gas leaving the compressor into the interior of at least one of the plurality of support members; means for flow connecting the interior of said one support member to the compressed air receiving means; and means for allowing the compressor rotor to follow the compressor housing to accommodate changes in the axial location of the compressor housing caused by temperature changes in the support members and the drive shaft during compressor operation.

Preferably, the housing following means includes expansible coupling means positioned for interconnecting the compressor shaft with the drive shaft, and means associated with the compressor housing for fixing the axial position of the compressor shaft relative to the housing.

The accompanying drawing, which is incorporated in and constitutes a part of this specification, illustrates one embodiment of the invention, and together with the description, serves to explain the principles of the invention.

Reference will now be made in detail to the present preferred embodiment of the invention, an example of which is illustrated in the accompanying drawing.

DESCRIPTION OF THE PREFERRED EMBODIMENT

Figure 1:
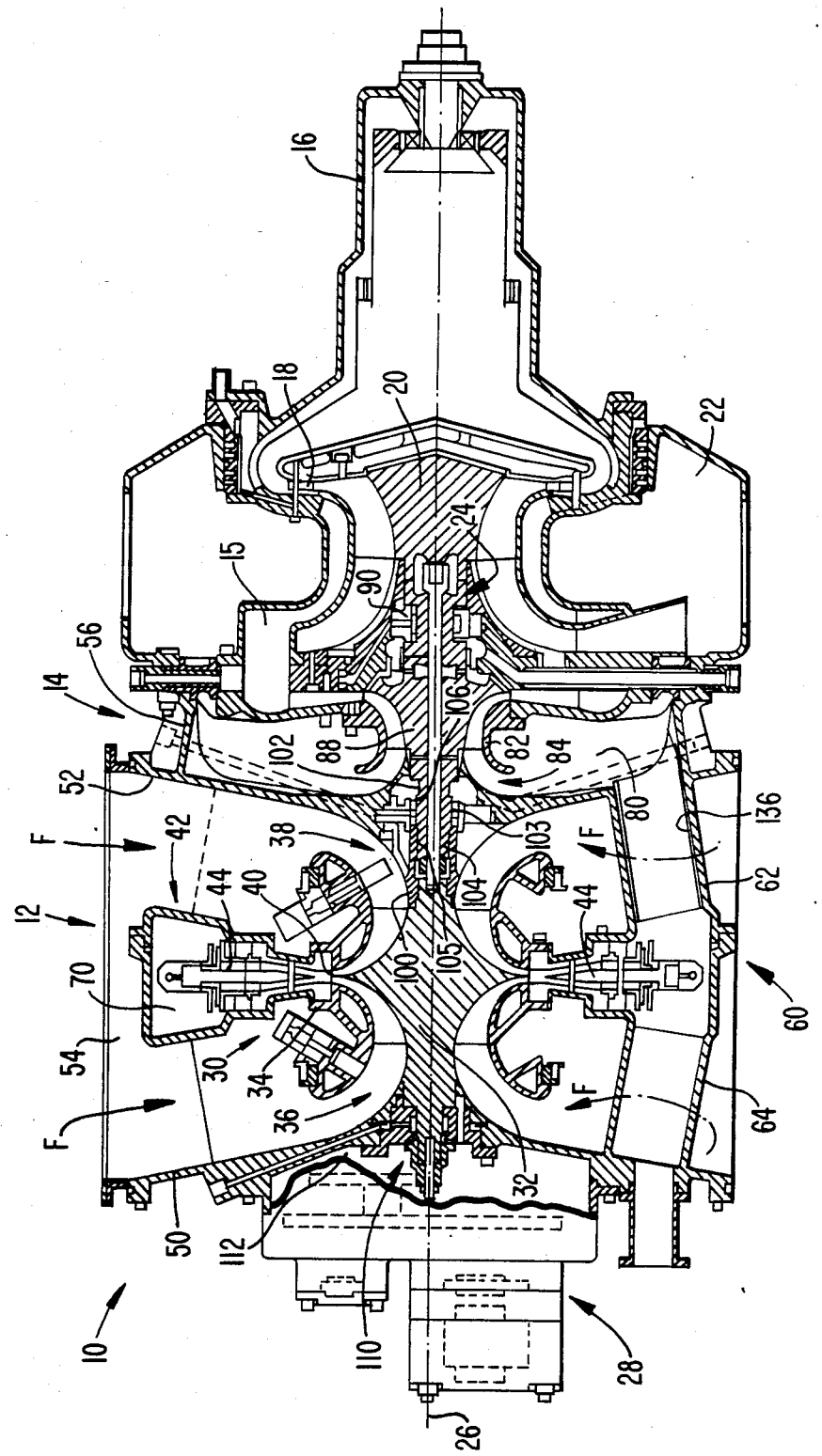
FIG. 1 is a cross-sectional schematic view of a gas turbine utilizing the double entry clearance control and support apparatus of the present invention.

Referring initially to FIG. 1, there is shown a preferred embodiment of the present invention in the form of a gas turbine gas generator designated generally by 10. Gas generator 10 includes a low pressure compressor stage 12, a high pressure compressor of stage 14 which is operatively connected to receive compressed air from the low pressure stage 12 in a manner to be explained in more detail hereinafter, and to supply compressed air for combustion purposes. As shown in FIG. 1, gas generator 10 has a single combustor 16 for receiving compressed air from high pressure stage 16 via duct 15 and then feeding the combustion gases to the turbine inlet nozzle assembly 18 and then to radial inflow turbine rotor 20 for work producing expansion. The combustion gases thereafter pass to turbine exhaust manifold 22 and are either released to the atmosphere if already fully expanded, or are otherwise utilized such as by a free power turbine (not shown) to extract additional work.

As depicted in FIG. 1, gas turbine 10 has a shaft assembly 24 defining an axis of rotation 26 and connecting turbine rotor 20 to drive both high pressure compressor stage 14 and low pressure compressor stage 12.

Shaft assembly 24 is also connected to a gear assembly designated generally by the numeral 28 for providing power only for auxilaries such as lube oil pumps and fuel pump (both not shown) but with modifications could be used to extract net power making gas generator 10 a "single shaft" engine. An alternative construction could be utilized wherein the power is extracted via a separate free power turbine in a "two shaft" configuration. This alternative and other arrangements would immediately be appreciated by one skilled in the art.

With continued reference to FIG. 1, low pressure compressor stage 12 comprises a double entry compressor module 30 and the present invention advantageously provides means for mounting double entry compressor module 30 to the gas generator 10 while maintaining control of the running clearances in both compressor stages and the turbine. The clearance control and mounting means could advantageously be used in other applications such as with an axial turbine and without a second, high pressure compressor stage or various other combinations. Moreover, the double entry compressor clearance control and mounting means of the present invention could be used in a gas compressor apparatus where the double entry compressor drive and gas receiving components are located axially adjacent the double entry compressor. Thus, the embodiment shown in FIG. 1 is illustrative and should not be considered to limit the scope of the present invention which is defined by the claims.

As depicted in FIG. 1, double entry compressor module 30 includes a compressor rotor 32 having twin axially-opposed flow paths and surrounding housing 34 which defines a pair of flow-symmetric axially opposed compressor entrances 36, 38. Double entry compressor module 30 has an annular radially directed compressor exit 40 operatively connected to a diffuser assembly 42. Diffuser assembly 42 receives the high velocity air from exit 40 and converts the high velocity air to higher pressure, low velocity air for ultimate transmission to high pressure compressor 14 and then to combustor 16. Diffuser assembly 42 could be replaced by a manifold assembly (not shown) designed to preserve a portion of the dynamic head of the air exiting exit 10 in certain alternative embodiments to be discussed henceforth.

Pressure ratios across double entry compressor module 30 and diffuser assembly 42 are expected to be greater than about 6:1, with the maximum pressure ratio of about 10:1.

Figure 2:
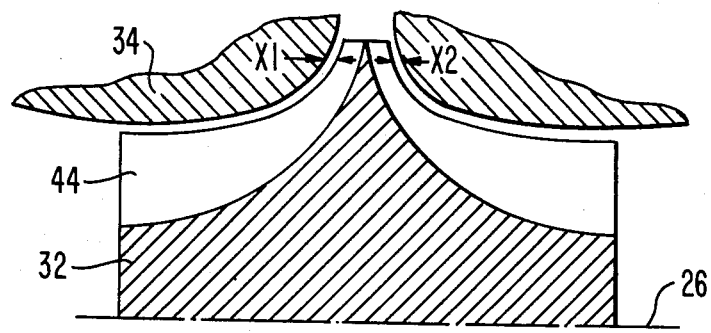
FIG. 2 is an enlarged detail of the gas turbine of FIG. 1 showing the double entry compressor rotor running clearances.

An important factor influencing the performance of dual entry compressors such as dual entry compressor 30 is the maintenance of close and proper clearance between the blades 44 of turbine rotor 32 and the immediately adjacent portions of housing 34. As best seen in FIG. 2, the axial components X1 and X2 of the running clearance between the respective vanes 44 and the walls of housing 34 can be expected to vary for shifts in the relative axial positions of the compressor rotor 32 and housing 34 along the axis of rotation 26. Such shifts can result from thermal expansion of certain components of gas generator 10 caused by temperature changes during operation. Excessive increases in the running clearances can significantly degrade performance while excessive decreases can lead to damage-inducing interference. Furthermore, relative shifts in axial position can lead to undesireable flow imbalance between the respective sides in compressor rotor 32, as increases in X1 are necessarily accompanied by decreases in X2 and vice versa. Thus, it is important to minimize the relative axial shifts between compressor rotor 32 and housing 34.

In accordance with the present invention, the apparatus for controlling the axial component of the running clearances of a high pressure ratio dual entry radial compressor include compressor inlet shroud means for channeling the incoming air into the compressor entrances, with the inlet shroud means including flow symmetric first and second inlet shrouds operatively connected to the respective compressor axial entrances. As embodied herein, shrouds 50 and 52 are provided to channel incoming air to the compressor entrances 36 and 38, respectively. Shrouds 50 and 52 are generally annular in shape and merge to a common annular air inlet region 54. As shown in FIG. 1, shrouds 50 and 52 are made an integral part of gas turbine frame assembly but they can alternatively be made separate parts. Importantly, shrouds 50 and 52 are flow symmetric; that is, they provide essentially the same size and shape for the respective air flow paths from the common pressure inlet region 54 to the respective compressor entrances 36 and 38 in order to provide balanced mass flow to each side of compressor rotor 32.

Further in accordance with the present invention, the apparatus includes a plurality of elongated, hollow rigid support members distributed around and extending generally parallel to the axis of rotation. The support members supportably interconnect the dual entry compressor housing and the first and second inlet shrouds to the gas turbine frame and the support members fix the axial position of the compressor housing relative to the gas turbine frame. As embodied herein, a total of 6 hollow, pipe-type supports 60, each composed of right (with respect to the FIG. 1 depiction) support segment 62 and left support segment 64, are circumferentially spaced about shaft assembly 24. Each support 60 interconnects shroud 50, housing 34, and shroud 52 and thus serves to rigidly fix the axial spacing of compressor module 30 relative to gas turbine frame 56. Supports 60 extend generally in the direction of shaft assembly 24 but are shown configured in a shallow "V" to provide increased rigidity. Supports 60 including segments 62 and 64 pass through the compressor inlet plenum regions defined by shrouds 50 and 52. Consequently, they are formed from essentially round pipe members for providing low flow resistance to the incoming air which flows across and between the individual supports 60 to the respective compressor entrances (represented by arrows F).

Preferably, the external configurations of supports 60 should be such that the cross-flow profiles provided by segment 64 to the incoming air in the plenum defined by shroud 50 are essentially identical to the profiles provided by segment 62 in the plenum defined by shroud 52, to preserve flow symmetry necessary to achieve a balanced air mass flow to the respective compressor entrances 36, 38.

Further in accordance with the present invention, the apparatus includes means for channeling the diffused air leaving the compressor into the interior of at least one of the plurality of support members. As embodied herein, and with continued reference to FIG. 1, diffuser assembly 42 is provided with an annular plenum 70 for collecting the diffused air. For the embodiment shown in FIG. 1, plenum 70 is flow-connected with the interiors of each of the six support segments 62 through the structural interconnection with compressor module 30 to provide the diffused high pressure air access to the interiors of support segments 62.

In accordance with the present invention, the apparatus includes means for flow-connecting the interior of the compressed air-carrying support member to the combustor. As embodied herein, the interiors of each of the support segments 62 also are flow-connected with the inlet plenum 80 of high pressure compressor stage 14. As shown in FIG. 1, high pressure compressor 14 is a single entry radial compressor having a housing 82 defining a compressor entrance 84 for receiving compressed air from inlet plenum 80. The high pressure compressor housing 82 also defines compressor exit 86 in flow communication with the combustor supply duct 15. High pressure compressor rotor 88 is positioned within housing 82 and is mounted for rotation with shaft assembly 24. Thus, the compressed air flow path proceeds from the collection plenum 70 of the double entry compressor module 30, through support segments 62, to the high pressure compressor stage inlet plenum 80 and on to combustor 16, that is, past compressor rotor 88 and through duct 15.

During operation, a portion of the work imparted to compress the air in the dual entry compressor module 30 manifests itself in an increase in the temperature of the compressed air exiting plenum 70 and travelling through hollow support segments 62. Unavoidably, support segments 62 experience an increase in temperature which causes thermal expansion of the segments and a consequent shift in the axial position of housing 34 of double entry compressor modules 30 relative to the portion of frame 56 containing the bearing assembly associated with turbine rotor 20. In FIG. 1, there is shown bearing assembly 90 positioned in frame 56, and bearing assembly 90 includes one or more thrust bearings for absorbing at least a part of the axial thrust component of turbine rotor 20 as transmitted through shaft assembly 24. Consequently, the portion of shaft assembly 24 proximate turbine rotor 20 is to a large degree constrained against axial movement by bearing assembly 90. This turbine shaft portion also undergoes thermally induced axial expansion and contraction with engine temperature changes. Absent further features of the present invention, the double entry compressor rotor 32 which is mounted on shaft assembly 24 would be unable to accommodate axial position shifts of the double entry compressor housing 34 and the turbine shaft portion during operation of gas generator 10.

Figure 3:
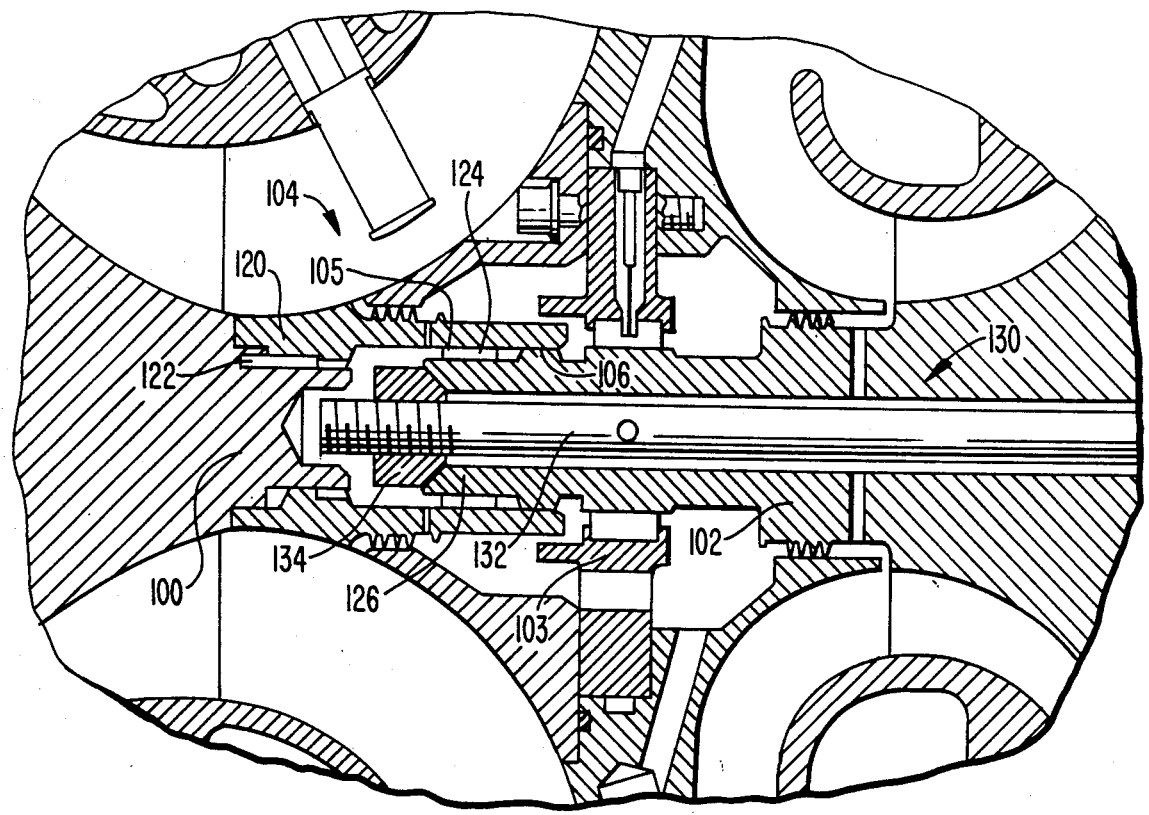
FIG. 3 is an enlarged cross-sectional detail of the expansible coupling used in the gas turbine of FIG. 1.

In accordance with the present invention, the apparatus for controlling the axial component of the running clearance of the double entry compressor further includes means for allowing the compressor rotor to follow the compressor housing to accommodate changes in the axial location of the compressor housing caused by temperature changes in the support members and the turbine shaft portion during compressor operation. As embodied herein, and as best seen in FIG. 3, shaft assembly 24 includes in-line coaxial shaft portions 100 and 102. Double entry compressor rotor 32 is mounted on shaft portion 100 while the turbine rotor is mounted on shaft portion 102. Bearing assembly 103 is provided to support shaft portion 102 in conjunction with bearing assembly 90. Shaft portions 100 and 102 are connected by expansible coupling assembly 104 to provide transmission of torque, to provide radial piloting support for shaft portion 100 from bearing assembly 103, and to equalize the rotational speeds of shafts portions 100 and 102. High pressure compressor rotor 88 also is mounted on shaft portion 102. Shaft 100 and the double entry compressor rotor 32 are effectively decoupled with respect to axial restraining forces exerted by the bearing assemblies 90 and 103 via shaft portion 102.

Further in accordance with the present invention, means associated with the double entry compressor housing are provided for fixing the axial position of the first shaft portion relative to the double entry compressor housing. As embodied herein, the position fixing means includes bearing assembly 110 provided in portion 112 of gas turbine frame 56 on the opposite side of double entry compressor module 30 relative to the coupling assembly 104. Bearing assembly 110 includes thrust bearings to essentially fix the axial position of shaft portion 100 and, by necessity, the double entry compressor rotor 32 relative to the position of the gas turbine frame portion 112. As relatively little heating and thus little length changes occur in support segments 64, the axial position of frame portion 112 is essentially fixed relative to the axial position of the double entry compressor housing 34 with the result that the shaft portion 100, and thus the double entry compressor rotor 32, will "follow" housing 34, that is, adjust axially, with changes in the axial position of double entry compressor housing 34 and frame portion 112, thereby maintaining the running clearances X1, X2.

Preferably, coupling assembly 104 includes helical spline 105 which provides axial reaction forces against both shaft portions 100 and 102, during torque transmitting operation. As best seen in FIG. 3, coupling assembly 104 which joins shaft portions 100 and 102 includes spline sleeve 120 attached via locking pin 122 for dependent rotation with shaft portion 100 and helical splines 124 formed on the inner circumference of sleeve 120 and on the outer surface of end 126 of shaft portion 102. Splines 124 have about a 5–10° helix angle and serve to transfer at least some of the axial thrust from bearing assembly 90 to bearing assembly 110. Helical spline coupling assembly 104 thus would provide a biasing force tending to insure axial positioning of shaft portion 100, and thus double entry compressor rotor 32, relative to the frame portion 112 and to double entry compressor housing 34.

Coupling 104 also includes a piloting land 106 to prevent relative radial movement between shaft portion 100 and 102 while permitting axial sliding relative movement.

Also shown in detail in FIG. 3 is tie-bolt assembly 130 for providing a clamping force between turbine rotor 20 and shaft portion 102 on which high pressure compressor rotor 88 is mounted. Tie-bolt assembly 130 includes tie-bolt 132 engaging turbine rotor 20 at one end (FIG. 1) and nut 134 threaded onto the other end of the tie-bolt 132 and seated against end 126 of shaft portion 102. Tie-bolt 132 can be preloaded through nut 134 to ensure coupling engagement under maximum shock-load conditions.

It is also preferred that means are provided to retard heat transfer to the support segments 62 to minimize thermal expansion of the support elements. As embodied herein, liners 136 are provided adjacent the inner walls of support segment 62 to provide insulation. Retarding the heat transfer to support segment 62 has the additional benefit of retarding heating of the incoming air in the plenums formed by shroud 52. Increases in the temperature of the incoming air to the double entry compressor entrance 38, relative to the temperature of the air incident upon entrance 36, can cause imbalances in the respective mass flow rates, and consequent loss of overall compressor efficiency.

Further, less than the total number of support segments 62 can be used to carry the compressed air from module 30 and still come within the scope of the present invention. However, for applications as shown in FIG. 1 having a high pressure compressor stage, using all support segments 62 improves the flow distribution around inlet plenum 80 and is preferred in such cases.

In another embodiment (not shown), supports 62 are made to provide further diffusion of the air exiting diffuser apparatus 42 by being fabricated with a cross-sectional flow area increasing from the inlet to the exit of supports 62 in the air flow direction. In such a case, plenum 70 could be replaced by one or more collecting manifolds configured to preserve dynamic head.

It will be apparent to those skilled in the art that various modifications and variations could be made in the double entry compressor clearance control and support apparatus of the present invention without departing from the scope or the spirit of the invention.

What is claimed is:

1. Apparatus for controlling the running clearance and improving the stability of a dual entry radial gas compressor of the type having a housing with a pair of axially opposed entrances for the incoming gas, a common radially disposed exit, diffuser means for converting high velocity gas received from the compressor exit to higher pressure, higher temperature and lower velocity, and a compressor rotor positioned within the housing and mounted on a shaft, the diffused high pressure, high temperature gas being deliverable to an axially adjacent compressed gas receiving means, the receiving means also including compressor driving means having a drive shaft for in-line connection to the compressor shaft, the apparatus comprising:

compressor inlet shroud means for channeling the incoming gas to the compressor entrances, said inlet shroud means including flow symmetric first and second inlet shrouds operatively connected to respective compressor axial entrances for defining flow symmetric first and second inlet paths to the axially opposed compressor entrances, said second flow path being defined as the flow symmetric inlet path proximate the compressed gas receiving means;

a plurality of elongated, hollow rigid support members distributed around, and extending essentially parallel to, the compressor rotor shaft, said support member having support member segments positioned in said first and second flow paths for supportably interconnecting the dual entry compressor housing, said first and second inlet shrouds, and the compressed air receiving means, said support members determining the axial position of the compressor housing relative to the compressed gas receiving means, said support members being configured and positioned to present in said first inlet path, profiles to the incoming air flow that are substantially identical to the profiles presented to said second inlet path;

means for channeling the hot diffused or partly diffused gas leaving the compressor into the interior of at least two of said support member segments;

means for flow connecting the interior of said two support member segments to the compressed air receiving means, said two support member segments comprising the primary means for delivering the high pressure, high temperature gas from the dual entry radial gas compressor axially to the adjacent compressed gas receiving means; and means for allowing the compressor rotor to follow the compressor housing to accommodate changes in the axial location of the compressor housing relative to the receiving means caused by temperature induced changes in the axial lengths of said two support member segments during compressor operation.

2. Apparatus as in claim 1 wherein said housing following means includes expansible coupling means positioned for interconnecting the compressor shaft with the drive shaft, and means associated with the compressor housing for fixing the axial position of said compressor shaft relative to the housing.

3. Apparatus as in claim 2 wherein said relative position fixing means includes a thrust bearing mounted in the housing, and wherein said expansible coupling includes a helical spline for continuously urging said compressor shaft against said thrust bearing during and after relative axial position changes of the housing and the drive shaft.

4. Apparatus as in claim 1 further including insulation means for reducing heat transfer from said two support member segments to the incoming gas in said first and second inlet paths.

5. Apparatus as in claim 1 wherein the dual entry compressor ratio is greater than about 6:1.

6. Apparatus for controlling the axial component of the running clearances of a high pressure ratio dual entry radial air compressor in a single shaft gas generator, the compressor having a housing with a pair of axially opposed entrances for the incoming air, a common radially disposed exit, diffuser means for converting high velocity air received from the compressor exit to higher pressure, higher temperature, and lower velocity, and a compressor rotor positioned within the housing and mounted on the shaft, the gas turbine further including a turbine rotor mounted on the shaft for driving the dual entry compressor, a gas generator frame, and a combustor for combusting the compressed air with fuel to provide combustion gases to drive the turbine rotor, the apparatus comprising:

compressor inlet shroud means for channeling the incoming air to the compressor entrances, said inlet shroud means including operatively connected to respective compressor axial entrances for defining flow symmetric first and second inlet path to the axially opposed compressor entrances, said second flow path being defined as the flow symmetric inlet path proximate the combustor;

a plurality of elongated, hollow rigid support members distributed around, and extending essentially parallel to, the shaft, said support members having support member segments positioned in said first and second flow paths for supportably interconnecting the dual entry compressor housing, said first and second inlet shrouds, and the gas generator frame, said support members fixing the axial position of the compressor housing relative to the gas generator frame;

means for channeling the hot diffused or partly diffused air leaving the compressor into the interior of at least two of said support member segments;

means for flow connecting the interior of said two support member segments to the combustor, said two support member segments comprising the primary means for delivering the high pressure, high temperature air from the dual entry compressor axially toward the combustor; and means for allowing the compressor rotor to follow the compressor housing to accommodate changes in the axial location of the compressor housing relative to the frame caused by temperature induced changes in the axial lengths of said support member segments during compressor operation.

7. Apparatus as in claim 6 wherein said housing following means includes the shaft being in two axial portions, expansible coupling means positioned for interconnecting a first portion of shaft on which the turbine is mounted with a second shaft portion on which the dual entry compressor is mounted, and means associated with the compressor housing for fixing the axial position of said second shaft portion relative to the housing.

8. Apparatus as in claim 7 wherein said relative position fixing means includes a thrust bearing mounted in the housing, and wherein said expansible coupling includes a helical spline for continuously urging said second shaft portion against said thrust bearing during and after relative axial position changes of the housing and the first shaft portion.

9. Apparatus as in claim 6 further including insulation means for reducing heat transfer from said two support member segments to the incoming air in said first and second inlet paths.

10. Apparatus as in claim 6 further including a high pressure compressor positioned in the compressed air flow path between the diffuser and the combustor, said high pressure compressor including an annular inlet for the air to be further compressed, wherein said support member segments are evenly angularly distributed about the shaft and wherein said flow connecting means includes a plenum for distributing said diffused air from said support member segments evenly around said annular inlet.

11. Apparatus as in claim 6 wherein the dual entry compressor pressure ratio is greater than about 6:1.

12. The apparatus as in claim 1 wherein said compressor shaft is rotatably supported at one shaft end by a bearing in said compressor housing and at the other shaft end by said drive shaft.

13. The apparatus as in claim 7 wherein said first shaft portion is rotatable supported in said frame by a pair of bearings positioned at the respective ends of said first shaft portion, and wherein said second shaft portion is rotatably supported at one second shaft portion end by a bearing in said compressor housing and at the other second shaft portion end by said first shaft portion.

14. The apparatus as in claim 1 wherein said hollow support members also serve to interconnect said shroud members with said compressor housing and said compressed gas receiving means.

15. The apparatus as in claim 6 wherein said hollow support members also serve to interconnect said shroud members with said compressor housing and said gas generator frame.

16. Apparatus for controlling the running clearance and improving the stability of a dual entry radial gas compressor of the type having a housing with a pair of axially opposed entrances for the incoming gas, a common radially disposed exit, diffuser means for converting high velocity gas received from the compressor exit to higher pressure, higher temperature and lower velocity, and a compressor rotor positioned within the housing and mounted on a shaft, the diffused high pressure, high temperature gas being deliverable to an axially adjacent compressed gas receiving means, the receiving means also including compressor driving means having a drive shaft for in-line connection to the compressor shaft, the apparatus comprising:

bearing means for rotatably supporting the compressor rotor shaft, at least in part, and for axially constraining the compressor rotor shaft, relative to the compressor housing;

a plurality of elongated, hollow rigid support members distributed around, and extending essentially parallel to, the comkpressor rotor shaft, said support members supportably interconnecting the dual entry compressor housing and the compressed air receiving means, said support members determining the axial position of the compressor housing relative to the compressed gas receiving means;

means for channeling the hot diffused or partly diffussed gas leaving the compressor into the interior of said support members;

means for flow connecting the interiors of said support members to the compressed air receiving means, said support members comprising the primary means for delivering the high pressure, high temperature gas from the dual entry radial gas compressor axially to the adjacent compressed gas receiving means; and means for interconnecting the compressor rotor shaft and the drive shaft, said interconnecting means providing dependent rotation and substantially independent axial movement therebetween during operation of the gas compressor, whereby the compressor rotor can follow the compressor housing to accommodate changes in the axial location of the compressor housing relative to the receiving means caused by temperature induced changed in the axial lengths of said support member during compressor operation.

17. The apparatus as in claim 16 further including a compressor inlet shroud for channeling the incoming air to the compressor housing entrances, wherein said shroud defines flow symmetric first and second inlet paths to the axially opposed compressor entrances, and wherein said support members are configured and positioned to present in said first inlet path, profiles to the incoming air that are substantially identical to the profiles presented in said second inlet path.

18. The apparatus as in claim 17 wherein said support members are also used to rigidly interconnect the compressor housing and said shroud.

19. The apparatus as in claim 16 wherein the compressed air receiving means includes a single entry high pressure radial compressor having an inlet plenum adjacent the dual entry radial compressor, said inlet plenum being flow connected to receive the high pressure, high temperature gas from said hollow support members.

20. The apparatus as in claim 16 wherein said interconnecting means includes a splined coupling.

* * * * *